(12) United States Patent
Yang et al.

(10) Patent No.: US 8,835,552 B2
(45) Date of Patent: Sep. 16, 2014

(54) LATEX FOR DIP MOLDING, COMPOSITION FOR DIP MOLDING, PREPARATION METHOD OF DIP MOLDED PRODUCT, AND DIP MOLDED PRODUCT PREPARED THEREBY

(75) Inventors: Seung Hun Yang, Daejeon (KR); Ho Yeul Choi, Daejeon (KR); Jung Su Han, Daejeon (KR); Byoung Yun Kim, Daejeon (KR); Jung Eun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 248 days.

(21) Appl. No.: 13/377,186

(22) PCT Filed: Jun. 11, 2010

(86) PCT No.: PCT/KR2010/003766
§ 371 (c)(1),
(2), (4) Date: Feb. 28, 2012

(87) PCT Pub. No.: WO2010/143912
PCT Pub. Date: Dec. 16, 2010

(65) Prior Publication Data
US 2012/0149859 A1 Jun. 14, 2012

(30) Foreign Application Priority Data

Jun. 12, 2009 (KR) .......................... 10-2009-0052288

(51) Int. Cl.
| | |
|---|---|
| *C08F 8/30* | (2006.01) |
| *C08F 2/00* | (2006.01) |
| *C08F 236/12* | (2006.01) |
| *C08L 13/02* | (2006.01) |
| *C08F 228/02* | (2006.01) |

(52) U.S. Cl.
CPC ............... *C08F 236/12* (2013.01); *C08L 13/02* (2013.01); *C08F 228/02* (2013.01)

USPC .......................................... 524/555; 526/209

(58) Field of Classification Search
USPC ......................................................... 524/555
See application file for complete search history.

(56) References Cited

U.S. PATENT DOCUMENTS

| | | | |
|---|---|---|---|
| 7,256,229 B2* | 8/2007 | Yeu et al. ..................... | 524/157 |
| 2004/0249055 A1 | 12/2004 | Yeu et al. | |
| 2005/0019509 A1* | 1/2005 | Gardner et al. ............... | 428/34.1 |
| 2006/0235158 A1* | 10/2006 | Ota et al. ..................... | 525/212 |
| 2007/0149693 A1 | 6/2007 | Aida et al. | |
| 2008/0227913 A1 | 9/2008 | Koide | |

FOREIGN PATENT DOCUMENTS

| | | |
|---|---|---|
| CN | 1589350 A | 3/2005 |
| CN | 1938373 A | 3/2007 |
| KR | 10-0452558 | 10/2004 |
| KR | 10-0452558 B1 | 10/2004 |
| WO | WO 2007-049689 A1 | 5/2007 |
| WO | WO 2008/001764 | 1/2008 |

\* cited by examiner

*Primary Examiner* — Hui Chin
(74) *Attorney, Agent, or Firm* — McKenna, Long & Aldridge LLP

(57) ABSTRACT

Provided are a latex for dip molding, a composition for dip molding, a preparation method of a dip molded product, and a dip molded product prepared thereby. The latex for dip molding includes a conjugated diene monomer, an ethylenically unsaturated nitrile monomer, and an ethylenically unsaturated acid monomer, wherein the latex further includes sodium methallyl sulfonate as a copolymerizable ionic monomer. A dip molded product having excellent tensile strength, elongation, and touch may be obtained from a composition using the latex according to the present invention, and the generation of limitations, such as non-uniformity of physical properties and difficulties in product management, may be prevented.

10 Claims, No Drawings

LATEX FOR DIP MOLDING, COMPOSITION FOR DIP MOLDING, PREPARATION METHOD OF DIP MOLDED PRODUCT, AND DIP MOLDED PRODUCT PREPARED THEREBY

CROSS-REFERENCE TO RELATED APPLICATIONS

This application is a National Phase Entry of PCT International Application No. PCT/KR2010/003766, filed Jun. 11, 2010, which claims the benefit of Patent Application No. 10-2009-0052288 filed in Korea on Jun. 12, 2009. The entire contents of all of the above applications are hereby incorporated by reference into the present application.

BACKGROUND

The present invention disclosed herein relates to a dip molded product having excellent tensile strength, elongation, and touch, a preparation method thereof, a composition for dip molding for preparing the dip molded product, and a latex for dip molding used in the composition for dip molding.

A natural rubber latex has typically been used as a raw material for dip molded products such as rubber gloves, but recently, there are limitations in that a protein in the natural rubber latex causes rash, itchiness, or common cold by allergic reactions occurred when the protein is in contact with human skin. Accordingly, a carboxylated acrylonitrile-butadiene-based copolymer latex, a synthetic rubber latex without including a protein, receives attention and the use amount thereof tends to increase.

In addition, high levels of physical properties, such as tensile strength, elongation, and touch, are recently required for a dip molded product obtained by using a typical composition for dip molding, while high qualities are needed with respect to a latex for dip molding according to the increase in the use amount thereof.

When the stability of a composition for dip molding is maintained, tensile strength, elongation, and touch of a dip molded product may be improved. When the stability of the composition for dip molding is not maintained, it may cause significant loss to a manufacturer of dip molded products because tensile strength, elongation, and touch of the dip molded products significantly decrease as well as the occurrence of limitations, such as flow marks and pinholes of the dip molded products. The foregoing stability of the composition for dip molding becomes more important in order to obtain high qualities of the dip molded product and may be an important factor in determining productivity of the dip molded product.

In many cases, the stability of the composition for dip molding commonly depends on a latex for dip molding. A latex used in the composition for dip molding is generally a carboxylated acrylonitrile-butadiene-based latex and the stability thereof is maintained by a carboxylic group and an emulsifier on a surface thereof. Typically, the carboxylic group may be obtained by using an ethylenically unsaturated acid as a copolymerizable monomer and the carboxylic group may increase stability by being fixed on a latex surface. However, in many cases, the carboxylic group may not provide sufficient chemical stability in a pH range of 9 to 12, a pH range of a typical composition for dip molding.

Therefore, an emulsifier is used for the chemical stability of the composition. Although the emulsifiers may differ according to a functional group thereof, the stability may be increased by using a generally used anionic emulsifier having a functional group, such as sulfate and sulfonate, or an ethylene oxide-based non-ionic emulsifier. However, since the emulsifier, different from the carboxylic group, is not fixed but absorbed on a latex, there are limitations in that efficiency for the stability may decrease by desorption occurred during the application of mechanical shear and the generation of gas bubbles may be severe.

Also, a scale problem may be generated as one of great difficulties in preparation of the latex for dip molding. A large amount of scales may be generated in a reactor or on an agitator during the preparation of the latex according to characteristics thereof. Since the scales may cause a lot of problems such as non-uniformity of physical properties during a continuous process by acting as an impurity during a subsequent process and great time and efforts may be required to remove the scales, the scales may greatly influence on the reduction of productivity.

Different from the scales formed in the reactor, coagulums may exist in a suspension and are filtered through screening after the completion of polymerization and during the preparation of the composition for dip molding. Product management may be difficult because a lot of time and costs are used for the filtration thereof and qualities of a dip molded product may deteriorate because fine agglomerates may appear in the dip molded product during dip molding.

SUMMARY

The present invention provides a dip molded product having excellent tensile strength, elongation, and touch.

The present invention also provides relative improvements of qualities through preventing the generation of limitations such as non-uniformity of physical properties and difficulties in product management by decreasing an amount of impurities such as scales generated during a preparation process of the dip molded product.

Embodiments of the present invention provide a latex for dip molding including: a conjugated diene monomer, an ethylenically unsaturated nitrile monomer, and an ethylenically unsaturated acid monomer, wherein the latex may further include a sodium methallyl sulfonate as a copolymerizable ionic monomer.

In some embodiments, contents of the foregoing components may be about 0.1 to 10 parts by weight of the sodium methallyl sulfonate based on 100 parts by weight of a monomer mixture including about 40 to 90 wt % of the conjugated diene monomer, about 9 to 50 wt % of the ethylenically unsaturated nitrile monomer, and about 0.1 to 10 wt % of the ethylenically unsaturated acid monomer.

In other embodiments, the conjugated diene monomer may be 1,3-butadiene, 2,3-dimethyl-1,3-butadiene, 2-ethyl-1,3-butadiene, 1,3-pentadiene, isoprene, or a mixture thereof.

In still other embodiments, the ethylenically unsaturated nitrile monomer may be acrylonitrile, methacrylonitrile, fumalonitrile, α-chloronitrile, α-cyanoethyl acrylonitrile, or a mixture thereof.

In even other embodiments, the ethylenically unsaturated acid monomer may be an ethylenically unsaturated carboxylic acid monomer, a polycarboxylic acid anhydride, an ethylenically unsaturated sulfonic acid monomer, an ethylenically unsaturated polycarboxylic acid partial ester monomer, or a mixture thereof.

In yet other embodiments, the latex may further include about 0.1 to 20 wt % of other ethylenically unsaturated monomers copolymerizable with the ethylenically unsaturated nitrile monomer and the ethylenically unsaturated acid monomer among total monomers.

In further embodiments, the other ethylenically unsaturated monomers copolymerizable with the ethylenically unsaturated nitrile monomer and the ethylenically unsaturated acid monomer may be a vinyl aromatic monomer, a fluoroalkylvinyl ether, an ethylenically unsaturated amid monomer, vinyl pyridine, vinyl norbornene, a non-conjugated diene monomer, an ethylenically unsaturated carboxylic acid ester monomer, and mixtures thereof.

In still further embodiments, emulsion polymerization may be performed by further including an emulsifier, a polymerization initiator, a chain transfer agent, a polymerization terminating agent, or a mixture thereof during the emulsion polymerization of the monomers.

In even further embodiments, the emulsifier may be an alkyl benzene sulfonate, an alcohol sulfate, an alcohol ether sulfonate, an alkyl phenol ether sulfonate, an alpha olefin sulfonate, a paraffin sulfonate, an ester sulfosuccinate, a phosphate ester, an alkyl phenol ethoxylate, a fatty amine ethoxylate, a fatty acid ethoxylate, an alkanoamide, or a mixture thereof.

In yet further embodiments, the coagulant may be barium chloride, calcium chloride, magnesium chloride, zinc chloride, aluminum chloride, barium nitrate, calcium nitrate, zinc nitrate, barium acetate, calcium acetate, zinc acetate, calcium sulfate, magnesium sulfate, and aluminum sulfate.

DETAILED DESCRIPTION OF THE EMBODIMENTS

The present invention relates to a latex for dip molding including a conjugated diene monomer, an ethylenically unsaturated nitrile monomer, and an ethylenically unsaturated acid monomer, and more particularly, to a latex for dip molding further including a sodium methallyl sulfonate as a copolymerizable ionic monomer.

Also, the present invention provides a composition for dip molding containing the latex for dip molding.

Also, the present invention provides a method of preparing a dip molded product including: (a) dipping a dip mold in a coagulant solution to attach the coagulant onto a surface of the dip mold; (b) dipping the dip mold having the attached coagulant in the composition to form a dip molded layer; (c) heat treating the dip molded layer formed on the dip mold to cross-link a latex resin.

Further, the present invention provides a dip molded product prepared according to the foregoing method.

Hereinafter, the present invention will be described in more detail.

A latex composition for dip molding of the present invention includes 0.1 to 10 parts by weight of a sodium methallyl sulfonate based on 100 parts by weight of a monomer mixture including 40 to 90 wt % of a conjugated diene monomer, 9 to 50 wt % of an ethylenically unsaturated nitrile monomer, and 0.1 to 10 wt % of an ethylenically unsaturated acid monomer.

The present invention discovered that mechanical and chemical stabilities of a latex may be significantly increased by using an ionic monomer copolymerizable on a latex surface. That is, since the ionic monomer having high solubility is fixed onto the latex surface by copolymerization, stability may be significantly increased by preventing the reduction of stability due to desorption and the generation of gas bubbles.

The present invention provides a latex for dip molding, in which stability thereof is significantly improved by using a sodium methallyl sulfonate, an ionic monomer particularly exhibiting innovative physical properties among the foregoing ionic monomers, and a composition for dip molding using the sodium methallyl sulfonate.

Since the sodium methallyl sulfonate copolymerizable ionic monomer suggested in the present invention may act to provide the stability of the latex which may not be sufficiently obtained with an emulsifier, the sodium methallyl sulfonate may be used by adjusting and mixing the amount thereof with respect to emulsifiers to be described later. The use amount of the sodium methallyl sulfonate may be in a range of 0.1 to 10 parts by weight based on 100 parts by weight of the monomer, and, for example, may be in a range of 0.1 to 5 parts by weight.

When the use amount of the sodium methallyl sulfonate is less than 0.1 parts by weight, the effect thereof may not be obtained, and when the use amount thereof is greater than 10 parts by weight, polymerization stability and the qualities of the dip molded product may instead deteriorate due to an excessive amount of ionic polymers included.

The conjugated diene monomer used in the present invention may be used alone or in combination of two or more selected from the group consisting of 1,3-butadiene, 2,3-dimethyl-1,3-butadiene, 2-ethyl-1,3-butadiene, 1,3-pentadiene, isoprene, or a mixture thereof. 1,3-butadiene and isoprene may be used among the foregoing conjugated diene monomers and, for example, 1,3-butadiene may particularly be used.

The used amount of the conjugated diene monomer is in a range of 40 wt % to 90 wt % among total monomers, and, for example, may be in a range of 45 wt % to 80 wt %. When the amount of the conjugated diene monomer is too small, the latex resin molded product becomes hard and touch becomes poor. On the other hand, when the amount of the conjugated diene monomer is too large, tensile strength of the latex resin molded product decreases.

The ethylenically unsaturated nitrile monomer used in the present invention may be used alone or in combination of two or more selected from the group consisting of acrylonitrile, methacrylonitrile, fumalonitrile, α-chloronitrile, α-cyanoethyl acrylonitrile, or a mixture thereof. Among the foregoing ethylenically unsaturated nitrile monomers, acrylonitrile and methacrylonitrile may be used and, for example, acrylonitrile may particularly be used.

The used amount of the ethylenically unsaturated nitrile monomer is in a range of 9 wt % to 50 wt % among the total monomers, and, for example, may be in a range of 15 wt % to 45 wt %. When the amount of the ethylenically unsaturated nitrile monomer is too small, tensile strength of the latex resin molded product decreases, and when the amount of the ethylenically unsaturated nitrile monomer is too large, the latex resin molded product becomes hard and touch becomes poor.

The ethylenically unsaturated acid monomer used in the present invention is an ethylenically unsaturated monomer containing an acid group, such as a carboxyl group, a sulfonic acid group, and an acid anhydride group. Examples of the ethylenically unsaturated acid monomer may be ethylenically unsaturated carboxylic acid monomers such as an acrylic acid, a methacrylic acid, an itaconic acid, a maleic acid, and a fumaric acid; polycarboxylic acid anhydrides such as a maleic anhydride and a citraconic anhydride; ethylenically unsaturated sulfonic acid monomers such as a styrenesulfonic acid; ethylenically unsaturated polycarboxylic acid partial ester monomers such as a monobutyl fumarate, a monobutyl maleate, and a mono-2-hydroxypropyl maleate. The ethylenically unsaturated carboxylic acid monomer may be used among the foregoing ethylenically unsaturated acid monomers, and the methacrylic acid may particularly be used. The ethylenically unsaturated acid monomer may be used in the form of an alkali metal salt or an ammonium salt. The ethylenically unsaturated acid monomer may be used alone or in combination of two or more thereof.

The used amount of the ethylenically unsaturated acid monomer is in a range of 0.1 wt % to 10 wt % among the total monomers, may be in a range of 0.5 wt % to 9 wt %, and, for example, may be in a range of 1 wt % to 8 wt %. When the amount of the ethylenically unsaturated acid monomer is too small, tensile strength of the latex resin molded product decreases, and when the amount of the ethylenically unsaturated acid monomer is too large, the latex resin molded product becomes hard and touch becomes poor.

The latex of the present invention may further include other ethylenically unsaturated monomers copolymerizable with the ethylenically unsaturated nitrile monomer and the ethylenically unsaturated acid monomer. Particular examples thereof may be vinyl aromatic monomers such as styrene, alkyl styrene, and vinyl naphthalene; fluoroalkylvinyl ethers such as a fluoro ethyl vinyl ether; ethylenically unsaturated amid monomers such as (meth)acrylamid, N-methylol (meth) acrylamid, N,N-dimethylol (meth)acrylamid, N-methoxy methyl(meth)acrylamid, and N-propoxy methyl(meth)acrylamid; vinyl pyridine; vinyl norbornene; non-conjugated diene monomers such as dicyclo pentadiene and 1,4-hexadiene; ethylenically unsaturated carboxylic acid ester monomers such as methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth) acrylate, 2-cyanoethyl (meth)acrylate, 1-cyanopropyl (meth) acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate, and dimethylaminoethyl (meth)acrylate. The ethylenically unsaturated monomer may be used alone or in combination of two or more thereof. The use amount of the ethylenically unsaturated monomer is in a range of 0.1 wt % to 20 wt % among the total monomers. When the use amount of the ethylenically unsaturated monomer is too large, soft touch and tensile strength are not balanced well.

In the present invention, emulsion polymerization may be performed by further including an emulsifier, a polymerization initiator, a chain transfer agent, a polymerization terminating agent, or a mixture thereof during the emulsion polymerization of the monomers.

The emulsifier used in the present invention is introduced in order to provide stability to the latex during and after a polymerization reaction, and various types of anionic emulsifiers and non-ionic emulsifiers may be used. Examples of the anionic emulsifier may be alkyl benzene sulfonates such as a sodium alkyl benzene sulfonate, an alcohol sulfate, an alcohol ether sulfonate, an alkyl phenol ether sulfonate, an alpha olefin sulfonate, a paraffin sulfonate, an ester sulfosuccinate, and a phosphate ester. Examples of the non-ionic emulsifier may be an alkyl phenol ethoxylate, a fatty amine ethoxylate, a fatty acid ethoxylate, and an alkanoamide. The emulsifier may be used alone or in combination of two or more thereof. The use amount thereof is in a range of 0.5 to 10 parts by weight based on 100 parts by weight of the monomer.

The polymerization initiator is not particularly limited, but a radical initiator may be used as the polymerization initiator. Examples of the radical initiator may be inorganic peroxides such as a sodium persulfate, a potassium persulfate, an ammonium persulfate, a potassium perphosphate, and a hydrogen peroxide; organic peroxides such as a t-butyl peroxide, a cumene hydroperoxide, a p-menthane hydroperoxide, a di-t-butyl peroxide, a t-butylcumyl peroxide, an acetyl peroxide, an isobutyl peroxide, an octanoyl peroxide, a dibenzoyl peroxide, a 3,5,5-trimethylhexanol peroxide, and a t-butylperoxy isobutyrate; nitrogen compounds such as azobisisobutyronitrile, azobis-2,4-dimethylvaleronitrile, azobiscyclohexanecarbonitrile, and methyl azobisisobutyrate. The polymerization initiator may be used alone or in combination of two or more thereof. The inorganic peroxide or the organic peroxide may be used among the foregoing radical initiators, the inorganic peroxide, for example, may be used, and the persulfate may particularly be used. The use amount of the polymerization initiator may be in a range of 0.01 to 2 parts by weight based on 100 parts by weight of the monomer and, for example, may be in a range of 0.02 to 1.5 parts by weight.

The chain transfer agent is not particularly limited, and examples of the chain transfer agent may be mercaptans such as α-methylstyrenedimer, t-dodecyl mercaptan, n-dodecyl mercaptan, octyl mercaptan; halogenated hydrocarbons such as carbon tetrachloride, methylene chloride, and methylene bromide; sulfur-containing compounds such as tetraethylthiuram disulfide, dipentamethylenethiuram, disulfide, and diisopropylxanthogen disulfide. The chain transfer agent may be used alone or in combination of two or more thereof. The mercaptans may be used among the foregoing chain transfer agents and, for example, the t-dodecyl mercaptan may be used. The use amount of the chain transfer agent may be in a range of 0.1 to 0.9 parts by weight based on 100 parts by weight of the monomer and, for example, may be in a range of 0.2 to 0.7 parts by weight.

Examples of the polymerization terminating agent may be aromatic hydroxy dithiocarboxylic acids such as hydroxyl amine, a hydroxyl amine sulfate, diethylhydroxy amine, a hydroxyl amine sulfonic acid and an alkali metal ion thereof, a sodium dimethyl dithiocarbamate, a hydro quinine derivative, a hydroxyl diethyl benzene dithiocarboxylic acid, and a hydroxyl dibutyl benzene dithiocarboxylic acid. The use amount of the polymerization terminating agent is not particularly limited, but the amount is in a range of 0.1 to 2 parts by weight based on 100 parts by weight of the monomer.

Also, subsidiary materials, e.g., a pigment such as titanium oxide, a filler such as silica, a thickener, a chelating agent, a dispersant, a pH adjuster, a deoxidizer, a particle size modifier, an antioxidant, or an oxygen scavenger, may be used if necessary during polymerization of the latex of the present invention.

In some cases, the polymerization reaction is stopped, and the latex resin of the present invention may then be obtained by removing unreacted monomers and adjusting a solid concentration or a pH value.

The present invention also relates to a composition for dip molding containing the latex for dip molding.

In addition to the latex for dip molding, a vulcanizing agent and a vulcanization accelerator may be mixed in the composition for dip molding.

Examples of the vulcanizing agent typically used for dip molding may be sulfurs, such as powdered sulfur, precipitated sulfur, colloidal sulfur, surface-treated sulfur and insoluble sulfur. The use amount of the vulcanizing agent may be in a range of 0.1 to 10 parts by weight based on 100 parts by weight of the latex solid content and, for example, may be in a range of 1 to 5 parts by weight.

Examples of the vulcanization accelerator typically used for dip molding may be 2-mercaptobenzothiazole (MBT), 2,2-dithiobisbenzothiozole-2-sulfenamide (MBTS), N-cyclehexylbenzothiazole-2-sulfenamide (CBS), 2-morpholinothiobenzothiazole (MBS), tetramethylthiuram monosulfide (TMTM), tetramethylthiuram disulfide (TMTD), zinc diethyldithiocarbamate (ZDEC), zinc dibutyldithiocarbamate (ZDBC), diphenylguanidine (DPG), or di-o-tolyguanidine (DOTG). The vulcanization accelerator may be used alone or in combination of two or more thereof. The use amount of the vulcanization accelerator may be in a range of 0.1 to 10 parts by weight based on 100 parts by weight of the latex solid content and, for example, may be in a range of 0.5 to 5 parts by weight.

The use amount of zinc oxide may be in a range of 0.1 to 5 parts by weight based on 100 parts by weight of the latex solid content and, for example, may be in a range of 0.5 to 2 parts by weight.

Also, the composition for dip molding may include subsidiary materials, such as a pigment, a thickener, a chelating agent, a dispersant, a pH adjuster, a deoxidizer, a particle size modifier, an antioxidant, and an oxygen scavenger, if necessary.

The latex composition of the present invention may be prepared by performing emulsion polymerization of a mixture of the each monomer, and a typical emulsion polymerization method may be used for the emulsion polymerization.

A method of adding the monomer mixture is not particularly limited, and any method may be used among a method of introducing the monomer mixture into a polymerization reactor at a time, a method of continuously introducing the monomer mixture into a polymerization reactor, a method of introducing a portion of the monomer mixture into a polymerization reactor and continuously introducing the remainder of the monomer mixture into the polymerization reactor.

Polymerization temperature is not particularly limited, and the polymerization temperature is usually in a range of 10° C. to 90° C. and may be in a range of 25° C. to 75° C.

The present invention relates to a method of preparing a dip molded product including: (a) dipping a dip mold in a coagulant solution to attach the coagulant onto a surface of the dip mold; (b) dipping the dip mold having the attached coagulant in the composition to form a dip molded layer; (c) heat treating the dip molded layer formed on the dip mold to cross-link a latex resin.

Hereinafter, a method of preparing a dip molded product by using a latex composition of the present invention will be described in more detail.

(a) Dipping a dip Mold in a Coagulant Solution to Attach the Coagulant onto a Surface of the Dip Mold Examples of the coagulant may be metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; sulfates such as calcium sulfate, magnesium sulfate, and aluminum sulfate. Calcium chloride and calcium nitrate may be used among the foregoing coagulants.

A coagulant solution is a solution in which the foregoing coagulant is dissolved in water, alcohol, or a mixture thereof. A concentration of the coagulant in the coagulant solution is usually in a range of 5 wt % to 75 wt %, and may be in a range of 15 wt % to 55 wt %.

(b) Dipping the Dip Mold Having the Attached Coagulant in the Composition to Form a Dip Molded Layer The dip mold having the attached coagulant is dipped in a latex composition for dip molding prepared from the latex resin composition of the present invention, and a dip molded layer is then formed on the dip mold by taking the mold out of the latex composition.

A typical dipping method may be used for the foregoing dipping method and, for example, a direct dipping method, an anode coagulation dipping method, and a Teague coagulation dipping method may be used. Among the foregoing methods, the anode coagulation dipping method may be used because a dip molded product having a uniform thickness may easily be obtained thereby.

(c) Heat Treating the Dip Molded Layer Formed on the Dip Mold to Cross-Link a Latex Resin During heat treating, a water component is first evaporated and curing is then performed through cross-linking. Subsequently, the dip molded layer cross-linked by heat treating is removed from the dip mold to obtain a dip molded product.

Hereinafter, the present invention will be described in detail according to examples and comparative examples. The following examples are merely presented to describe the present invention, and the scope of the present invention includes the scope defined by the following claims and modifications or substitutions thereof and is not limited to the scope of the present example.

EXAMPLE 1

1-1. Preparation of Latex for Dip Molding

A 10 L high-pressure reactor attached with an agitator, a thermometer, a cooler, and an inlet of nitrogen gas and equipped so as to continuously introduce a monomer, an emulsifier, and a polymerization reaction initiator was filled with nitrogen, and 2 parts by weight of sodium alkyl benzene sulfonate, 0.5 parts by weight of t-dodecyl mercaptan, 2 parts by weight of sodium methallyl sulfonate, and 140 parts by weight of deionized water were introduced based on 100 parts by weight of a monomer mixture including 30 wt % of acrylonitrile, 66 wt % of 1,3-butadiene, and 4 wt % of methacrylic acid, and heated at a temperature of 40° C.

0.3 parts by weight of potassium persulfate, a polymerization initiator, was introduced after heating and the polymerization was terminated by introducing 0.1 parts by weight of sodium dimethyldithiocarbamate when a conversion rate reached 95%. Unreacted monomers were removed through a deodorization process and a carboxylated acrylonitrile-butadiene-based copolymer latex having a solid content of 45% and a pH of 8.5 was obtained by adding ammonia water, an antioxidant, and an antifoaming agent.

Polymerization stabilities of the prepared latexes in parts per million (ppm) were calculated from an amount of impurities thereof based on a solid content after passing the latexes through 325 mesh and are presented in the following Table 1. Amounts of scales in the reactor are presented in the following Table 2.

1-2. Preparation of Composition for Dip Molding

A composition for dip molding having a solid content of 25% and a pH of 10.0 was obtained by adding 1.5 parts by weight of sulfur, 1.5 parts by weight of zinc oxide, 0.5 parts by weight of zinc dibutyldithiocarbamate (ZDBC), a 3% potassium hydroxide solution, and an adequate amount of secondary distilled water to the latex. Stabilities of the prepared compositions for dip molding in parts per million (ppm) were calculated from an amount of impurities thereof based on a solid content after passing the latexes through 325 mesh and are presented in the following Table 3.

1-3. Preparation of Dip Molded Product

A coagulant solution was prepared by mixing 22 parts by weight of calcium nitrate, 69.5 parts by weight of methanol, 8 parts by weight of calcium carbonate, and 0.5 parts by weight of a wetting agent (Teric 320, produced by Huntsman Corporation, Australia). A ceramic mold having a hand shape was dipped in the solution for 1 minute and removed therefrom, and the mold having a hand shape was then coated with the coagulant by drying at 70° C. for 3 minutes.

Next, the coagulant-coated mold was dipped in the composition for dip molding for 1 minute and removed therefrom, and the mold was then immersed in water or warm water for 3 minutes after being dried at 70° C. for 1 minute. The mold was again dried at 70° C. for 3 minutes, and was then cross-linked at 125° C. for 20 minutes. A cross-linked dip molded layer was peeled off from the mold having a hand shape to obtain a dip molded product having a glove shape.

EXAMPLE 2

A composition for dip molding and a dip molded product having a glove shape were prepared in the same manner as Example 1 except that 5 parts by weight of sodium methallyl sulfonate was used instead of using 2 parts by weight thereof, and physical properties are presented in the following Tables 1 to 3.

EXAMPLE 3

A composition for dip molding and a dip molded product having a glove shape were prepared in the same manner as Example 1 except that 10 parts by weight of sodium methallyl sulfonate was used instead of using 2 parts by weight thereof, and physical properties are presented in the following Tables 1 to 3.

EXAMPLE 4

A composition for dip molding and a dip molded product having a glove shape were prepared in the same manner as Example 1 except that 1 part by weight of sodium alkyl benzene sulfonate was used instead of using 2 parts by weight thereof, and physical properties are presented in the following Tables 1 to 3.

EXAMPLE 5

A composition for dip molding and a dip molded product having a glove shape were prepared in the same manner as Example 1 except that 35 wt % of acrylonitrile was used instead of using 30 wt % thereof and 61 wt % of 1,4-butadiene was used instead of using 66 wt % thereof, and physical properties are presented in the following Tables 1 to 3.

COMPARATIVE EXAMPLE 1

A composition for dip molding and a dip molded product having a glove shape were prepared in the same manner as Example 1 except that 2 parts by weight of sodium methallyl sulfonate was not used, and physical properties are presented in the following Tables 1 to 3.

COMPARATIVE EXAMPLE 2

A composition for dip molding and a dip molded product having a glove shape were prepared in the same manner as Example 5 except that 2 parts by weight of sodium methallyl sulfonate was not used, and physical properties are presented in the following Tables 1 to 3.

TABLE 1

| | Example 1 | Example 2 | Example 3 | Example 4 | Example 5 | Comparative Example 1 | Comparative Example 2 |
|---|---|---|---|---|---|---|---|
| Stability [ppm] | 31 | 25 | 91 | 61 | 24 | 1,279 | 986 |

TABLE 2

| | Example 1 | Example 2 | Example 3 | Example 4 | Example 5 | Comparative Example 1 | Comparative Example 2 |
|---|---|---|---|---|---|---|---|
| Scale [g] | 54 | 55 | 125 | 321 | 46 | 512 | 580 |

TABLE 3

| | Example 1 | Example 2 | Example 3 | Example 4 | Example 5 | Comparative Example 1 | Comparative Example 2 |
|---|---|---|---|---|---|---|---|
| Stability [ppm] | 92 | 105 | 45 | 56 | 31 | 335 | 345 |

According to the results in Tables 1 to 3, excellent results were obtained, in which the stabilities and scales of Examples 1 to 5 were lower than those of Comparative Examples.

EXPERIMENTAL EXAMPLE 1

Measurements of Physical Properties of Dip Molded Product

Test specimens having a dumbbell shape were prepared from the prepared dip molded product in accordance with ASTM D-412. Subsequently, the test specimens were tensile tested at an elongation rate of 500 mm/minute by using a universal testing machine (UTM). Tensile strengths and elongations at fracture were measured, and touches in terms of stress at 300% elongation were measured. The results thereof are presented in Table 4. The higher the tensile strength and elongations were, the better the qualities of the dip molded products were. The lower the stresses at 300% elongation were, the better the touches and qualities of the dip molded products were.

TABLE 4

| | Tensile strength (MPa) | Elongation (%) | Stress at 300% elongation (MPa) |
|---|---|---|---|
| Example 1 | 27.5 | 650 | 6.8 |
| Example 2 | 26.5 | 640 | 6.9 |
| Example 3 | 22.5 | 580 | 8.7 |
| Example 4 | 31.5 | 690 | 6.5 |
| Example 5 | 33.1 | 610 | 10.1 |
| Comparative Example 1 | 14.6 | 520 | 6.2 |
| Comparative Example 2 | 17.8 | 460 | 9.6 |

As shown in the results of Table 4, tensile strengths and elongations of the dip molded products prepared from the latexes of Examples 1 to 5 according to the present invention were better than those of Comparative Examples. In particular, it may be understood that the lower the stresses at 300% elongation were, the better the touches and qualities of the dip molded products were.

According to the present invention, a dip molded product having excellent tensile strength, elongation, and touch is provided, and limitations, such as non-uniformity of physical properties and difficulties in product management, may be resolved.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A latex for dip molding comprising:
a conjugated diene monomer;
an ethylenically unsaturated nitrile monomer; and
an ethylenically unsaturated acid monomer,
wherein the latex further comprises a sodium methallyl sulfonate as a copolymerizable ionic monomer,
wherein the latex does not include a styrene monomer, and
wherein the latex has a stability of about 24 ppm to 91 ppm.

2. The latex for dip molding of claim 1, wherein the latex comprises about 0.1 to 10 parts by weight of the sodium methallyl sulfonate based on 100 parts by weight of a monomer mixture including about 40 to 90 wt % of the conjugated diene monomer, about 9 to 50 wt % of the ethylenically unsaturated nitrile monomer, and about 0.1 to 10 wt % of the ethylenically unsaturated acid monomer.

3. The latex for dip molding of claim 1, wherein the conjugated diene monomer is selected from the group consisting of 1,3-butadiene, 2,3-dimethyl-1,3-butadiene, 2-ethyl-1,3-butadiene, 1,3-pentadiene, isoprene, and a mixture thereof.

4. The latex for dip molding of claim 1, wherein the ethylenically unsaturated nitrile monomer is selected from the group consisting of acrylonitrile, methacrylonitrile, fumalonitrile, α-chloronitrile, α-cyanoethyl acrylonitrile, and a mixture thereof.

5. The latex for dip molding of claim 1, wherein the ethylenically unsaturated acid monomer is selected from the group consisting of an ethylenically unsaturated carboxylic acid monomer, a polycarboxylic acid anhydride, an ethylenically unsaturated sulfonic acid monomer, an ethylenically unsaturated polycarboxylic acid partial ester monomer, and a mixture thereof.

6. The latex for dip molding of claim 1, wherein the latex further comprises about 0.1 to 20 wt % of other ethylenically unsaturated monomers copolymerizable with the ethylenically unsaturated nitrile monomer and the ethylenically unsaturated acid monomer among total monomers.

7. The latex for dip molding of claim 6, wherein the other ethylenically unsaturated monomers copolymerizable with the ethylenically unsaturated nitrile monomer and the ethylenically unsaturated acid monomer are a vinyl aromatic monomer, a fluoroalkylvinyl ether, an ethylenically unsaturated amid monomer, vinyl pyridine, vinyl norbornene, a non-conjugated diene monomer, an ethylenically unsaturated carboxylic acid ester monomer, and mixtures thereof.

8. The latex for dip molding of claim 1, wherein the latex is emulsion polymerized by including one or more selected from the group consisting of an emulsifier, a polymerization initiator, a chain transfer agent, a polymerization terminating agent, and a mixture thereof.

9. The latex for dip molding of claim 8, wherein the emulsifier is selected from the group consisting of an alkyl benzene sulfonate, an alcohol sulfate, an alcohol ether sulfonate, an alkyl phenol ether sulfonate, an alpha olefin sulfonate, a paraffin sulfonate, an ester sulfosuccinate, a phosphate ester, an alkyl phenol ethoxylate, a fatty amine ethoxylate, a fatty acid ethoxylate, an alkanoamide, and a mixture thereof.

10. A composition for dip molding comprising the latex for dip molding according to claim 1.

* * * * *